United States Patent
Dimitriadis et al.

(10) Patent No.: US 8,401,679 B2
(45) Date of Patent: Mar. 19, 2013

(54) METHODS AND A SYSTEM FOR DETECTING FRAUD IN BETTING AND LOTTERY GAMES

(75) Inventors: Christos K. Dimitriadis, Athens (GR);
Ioannis Christou, Peania Attikis (GR);
Menelaos Bakopoulos, Peania Attikis (GR)

(73) Assignee: Intralot S.A.-Integrated Lottery Systems and Services, Athens (GR)

( * ) Notice: Subject to any disclaimer, the term of this patent is extended or adjusted under 35 U.S.C. 154(b) by 0 days.

(21) Appl. No.: 13/275,823

(22) Filed: Oct. 18, 2011

(65) Prior Publication Data
US 2012/0035751 A1    Feb. 9, 2012

Related U.S. Application Data

(63) Continuation of application No. 12/787,024, filed on May 25, 2010.

(51) Int. Cl.
*G06F 19/00* (2011.01)
*G06Q 30/00* (2012.01)
*A63F 9/24* (2006.01)

(52) U.S. Cl. .......... 700/91; 705/14.22; 705/14.26; 463/42

(58) Field of Classification Search .......... 705/14.1, 705/14.22 FOR. 107; 700/91; 463/42
See application file for complete search history.

(56) References Cited

U.S. PATENT DOCUMENTS

| | | | | |
|---|---|---|---|---|
| 5,880,742 A * | 3/1999 | Rao et al. | | 345/440 |
| 5,903,880 A * | 5/1999 | Biffar | | 705/39 |
| 6,047,269 A * | 4/2000 | Biffar | | 705/39 |
| 6,149,522 A * | 11/2000 | Alcorn et al. | | 463/29 |
| 6,205,435 B1 * | 3/2001 | Biffar | | 705/41 |
| 6,341,778 B1 * | 1/2002 | Lee | | 273/292 |
| 6,379,247 B1 * | 4/2002 | Walker et al. | | 463/25 |
| 6,408,292 B1 * | 6/2002 | Bakalash et al. | | 1/1 |
| 6,645,077 B2 * | 11/2003 | Rowe | | 463/42 |
| 6,682,421 B1 * | 1/2004 | Rowe et al. | | 463/25 |
| 6,685,567 B2 * | 2/2004 | Cockerille et al. | | 463/43 |
| 6,917,940 B1 * | 7/2005 | Chen et al. | | 1/1 |
| 7,269,786 B1 * | 9/2007 | Malloy et al. | | 715/212 |
| 7,318,049 B2 * | 1/2008 | Iannacci | | 705/39 |
| 7,515,718 B2 * | 4/2009 | Nguyen et al. | | 380/278 |
| 7,562,086 B2 * | 7/2009 | Mirchandani et al. | | 1/1 |
| 7,594,855 B2 * | 9/2009 | Meyerhofer | | 463/42 |
| 7,951,002 B1 * | 5/2011 | Brosnan | | 463/42 |

(Continued)

OTHER PUBLICATIONS

Wikipedia Mar. 6, 2012; "Pot Odds"; converting odds ratios to and from percentages.*

(Continued)

*Primary Examiner* — John Weiss
*Assistant Examiner* — Adam Chornesky
(74) *Attorney, Agent, or Firm* — Greenberg Traurig, LLP

(57) ABSTRACT

In one embodiment of the invention, a method to detect fraud includes a) receiving by the computer system from a source information regarding a plurality of played coupons for at least one game, wherein the plurality of played coupons comprises at least one first coupon; b) populating by the computer system a two-dimensional array for each played game from the received information, wherein the at least one two-dimensional array holds aggregated game statistics, c) storing by the computer system the at least one two-dimensional array with in a data structure; d) scanning, using the received information for the at least one first coupon, by the computer system the at least one data structure to identify at least one abnormal pattern; and e) generating, when the at least one abnormal pattern is identified, by the computer system an alert prior to a payout on the at least one first coupon.

27 Claims, 3 Drawing Sheets

U.S. PATENT DOCUMENTS

| | | | |
|---|---|---|---|
| 8,016,670 B2* | 9/2011 | LeMay et al. | 463/30 |
| 8,056,802 B2* | 11/2011 | Gressel et al. | 235/382 |
| 8,088,001 B2* | 1/2012 | Preisach | 463/25 |
| 2003/0018584 A1* | 1/2003 | Cohen et al. | 705/52 |
| 2003/0032485 A1* | 2/2003 | Cockerille et al. | 463/43 |
| 2003/0195025 A1* | 10/2003 | Hill | 463/11 |
| 2003/0204499 A1* | 10/2003 | Shahabi et al. | 707/3 |
| 2004/0117618 A1* | 6/2004 | Kawaguchi et al. | 713/156 |
| 2005/0153776 A1* | 7/2005 | LeMay et al. | 463/30 |
| 2006/0010159 A1* | 1/2006 | Mirchandani et al. | 707/102 |
| 2006/0049624 A1* | 3/2006 | Brosnan et al. | 283/17 |
| 2006/0064380 A1* | 3/2006 | Zukerman | 705/44 |
| 2006/0090073 A1* | 4/2006 | Steinberg et al. | 713/170 |
| 2007/0055440 A1* | 3/2007 | Denker et al. | 701/200 |
| 2007/0208618 A1* | 9/2007 | Paintin et al. | 705/14 |
| 2007/0270213 A1* | 11/2007 | Nguyen et al. | 463/29 |
| 2008/0090648 A1* | 4/2008 | Brosnan et al. | 463/25 |
| 2010/0185581 A1* | 7/2010 | Bakalash et al. | 707/602 |
| 2010/0205302 A1* | 8/2010 | Rechterman | 709/226 |
| 2010/0262476 A1* | 10/2010 | Amour | 705/14.14 |
| 2011/0179176 A1* | 7/2011 | Ravichandran et al. | 709/226 |
| 2011/0295672 A1* | 12/2011 | Dimitriadis et al. | 705/14.26 |
| 2012/0035751 A1* | 2/2012 | Dimitriadis et al. | 700/91 |
| 2012/0179713 A1* | 7/2012 | Stolte et al. | 707/769 |

OTHER PUBLICATIONS

Wikipedia Mar. 22, 2012; "Hash Function"; any algorithm or subroutine that maps large data sets . . . to smaller data sets . . . .*

Wikipedia Mar. 22, 2012; "Hash Table"; hash table or hash map is a data structure that uses hash function to map keys to associated values.*

Wikipedia Mar. 22, 2012; "Data Cube"; a three (or higher) dimensional array of values commonly used to describe a time series of image data.*

Jiawei Han and Micheline Kamber; Solution_of_Data.Mining. Concepts.and.Techniques.2nd.Ed-1558609016; "Data Mining: Concepts and Techniques 2nd Edition"; Morgan Kaufmann 2006.*

Bugajski, Joseph et al. ; DatQualModHiVolTaStrmBugajski2004; "Data Quality Models for High Volume Transaction Streams: A Case Study"; Visa International Svcs—Conference Feb. 2004; ACM 1-58113-000-0/0080004.*

DialogSrchDataCubeEtcEarlier25may2010, files 1, 2 and 3; Dialog searches by Examiner for articles prior to May 25, 2010 priority date; performed Oct. 18, 2012; (3) files.*

Michele Basseville, Igor Nikiforov; "Detection of Abrupt Changes: Theory and Application;"DetectionOfAbruptChangesBassevilleNikiforov; Prentice-Hall, Inc. 1993.*

"Introduction to Data Cubes"; file: dcubesUReginaCa22Oct2012; from website http://www2.cs.uregina.ca/~dbd/cs831/notes/dcubes/dcubes.html.*

Microsoft Excel 2002; "Just What Are Cubes Anyway ((A Painless Introduction to OLAP Technology)"; http://msdn.microsoft.com/en-us/library/office/aa140038(v=office.10).aspx accessed Oct. 18, 2012.*

Wikipedia; "OLAP Cube", http://en.wikipedia.org/wiki/OLAP_cube accessed Oct. 18, 2012.*

Curry,et al. "Detecting Changes in Large Data Sets of Payment Card Data: A Case Study" ; KDD'07, Aug. 12-15, 2007, San Jose, California, USA. Copyright 2007 ACM 978-1-59593-609-7/07/0008; 5 pages.

* cited by examiner

METHODS AND A SYSTEM FOR DETECTING FRAUD IN BETTING AND LOTTERY GAMES

FIELD OF THE INVENTION

One embodiment of the present invention relates to a method for identifying and preventing fraud in non-Internet-based Lottery and Betting games (including terminal-based or any other online or offline approach). Another embodiment of the present invention relates to a method for identifying and preventing fraud in Internet-based Lottery and Betting Gaming modes. The methods consist of the definition of the parameters of a Lottery and/or Betting system that are correlated in order to identify fraud cases, as well as the correlation functions themselves.

BACKGROUND OF THE INVENTION

Most online businesses today are familiar with the negative impact associated with fraud. The damage caused by the use of cheating techniques, stolen financial data, identity theft, spam, phishing, internal system behavior intervention and other similar activities can be enormously expensive and difficult to manage. The Lottery and Betting sector in particular is increasingly exposed to all of these dangers.

The online environment provides very little verifiable information related to players and their accounts. In fact, the anonymity of online gaming services has actually encouraged the invention and dissemination of many new types of fraud. The motives for such actions vary from simply "beating the system" to profit making scams from insiders and outsiders.

BRIEF SUMMARY OF THE INVENTION

In one embodiment, the instant invention identifies fraud cases with sufficient efficiency in high volume of data. In another embodiment, the instant invention provides at most two sequential scans of the data and stores only aggregate statistics of the coupons contained in the data into a data cube which possesses a granularity sufficient to catch all specified fraud scenarios. In some embodiments, coarse-grained time intervals (with a factor of granularity that is user-controlled), in other words sampling on time at user-controlled sampling rates, help reduce the amount of data required to be resident in main memory.

In one embodiment, the instant invention may include a method to detect fraud performed in a computing system that includes a) receiving by the computer system from at least one source information regarding a plurality of played coupons for at least one game, wherein the plurality of played coupons comprises at least one first coupon and at least one second coupon; b) populating by the computer system at least one two-dimensional array for each played game from the received information, i) wherein the at least one two-dimensional array holds aggregated game statistics, and ii) wherein the aggregate statistics is user-defined and includes: 1) an identity of the at least one source, 2) the received information for the plurality of played coupons, and 3) at least one of: a) a frequency of at least one played amount, b) a number of cancelled coupons, c) a maximum coupon value played, and d) a maximum number of combinations per the at least one first coupon and the at least one second coupon; c) storing by the computer system the at least one two-dimensional array with in at least one data structure; d) scanning, using the received information for the at least one first coupon, by the computer system the at least one data structure to identify at least one abnormal pattern; e) generating, when the at least one abnormal pattern is identified, by the computer system an alert prior to a payout on the at least one first coupon; f) scanning, using the received information for the at least one second coupon, by the computer system the at least one data structure to identify at least one abnormal pattern; and g) generating, when the at least one abnormal pattern is identified, by the computer system an alert prior to a payout on the at least one second coupon.

In one embodiment of the instant invention, the at least one abnormal pattern is when a ratio of a coupon gross amount for a random player to a total gross amount for all players in the at least one game exceeds a predetermined ratio amount.

In one embodiment of the instant invention, the step of scanning by the computer system further comprises: identifying by the computer system a first suspected coupon and a second suspected coupon, wherein a suspected coupon is the at least one played coupon whose played amount exceeds a predetermined played threshold amount; hashing by the computer system the aggregate statistics regarding the first suspected coupon to generate a first hash value; hashing by the computer system the aggregate statistics regarding the second suspected coupon to generate a second hash value; aggregating by the computer system the first and the second hash values when a length of the first hash value differs from a length of the second hash value by less than a predefined difference number; and scanning, when a length of the first hash value differs from a length of the second hash value by less than a predefined difference number, by the computer system the aggregate statistics regarding the first and the second suspected coupons, wherein the at least one abnormal pattern is a presence of similar betting combinations from the same at least one agent.

In one embodiment of the instant invention, the at least one abnormal pattern is a presence of similar betting combinations from at least two agents. In one embodiment of the instant invention, the at least one abnormal pattern is when a frequency of cancellations for the at least one agent exceeds a predetermined cancellation frequency threshold number.

In one embodiment of the instant invention, the at least one abnormal pattern is when a percentage of participation in the at least one game during a sampled time period to a total participation in the at least one game exceeds a predetermined participation percentage. In one embodiment of the instant invention, the at least one abnormal pattern is when the at least one played coupon includes bets for all played combinations in the at least one played coupon.

In one embodiment of the instant invention, the at least one abnormal pattern is when a plurality of the played coupons sold by the same agent include bets having the same amount placed for all played combinations. In one embodiment of the instant invention, the at least one abnormal pattern is when a plurality of the played coupons sold by a plurality of the agents include bets having the same amount placed for all played combinations.

In one embodiment of the instant invention, the at least one abnormal pattern is when a plurality of the played coupons sold by the same agent include bets having the same amount placed for all played combinations. In one embodiment of the instant invention, the at least one abnormal pattern is when a plurality of the played coupons sold by a plurality of the agents include bets having the same amount placed for all played combinations.

In one embodiment of the instant invention, the at least one abnormal pattern is when a plurality of the played coupons sold by the same agent include bets having amounts that are less than a limit amount by less than a predetermined deviation amount. In one embodiment of the instant invention, the at least one abnormal pattern is when the at least one played coupon is a winning coupon and wherein the winning coupon is received for payment during a predetermined period prior to an expiration date of the wining coupon.

In one embodiment, the instant invention may include a method to detect fraud performed in a computing system, that includes: a) receiving by the computer system from at least one source information about a plurality of transactions regarding at least one game, wherein the plurality of transactions comprises at least one first transaction and at least one second transaction; b) populating by the computer system at least one two-dimensional array for each player with information from the received plurality of transactions, i) wherein the at least one two-dimensional array holds aggregated game statistics regarding each player's participation in a particular game during at least one period of time, and ii) wherein the aggregate statistics is user-defined and comprises a distribution of cash in—cash out amounts per each play type played by the player, wherein the distribution is based on: 1) an amount of each transaction; 2) a largest amount from all cash in—cash out amounts; 3) a total number of transactions whose value was within a predetermined range; and 4) at least one transaction whose value was required official approval; c) storing by the computer system the at least one two-dimensional array in at least one data structure; d) scanning, using the received information for the at least one first transaction, by the computer system the at least one data structure to identify at least one abnormal pattern; e) generating, when the at least one abnormal pattern is identified, by the computer system an alert prior to a payout on the at least one first transaction; f) scanning, using the received information for the at least one second transaction, by the computer system the at least one data structure to identify at least one abnormal pattern; and e) generating, when the at least one abnormal pattern is identified, by the computer system an alert prior to a payout on the at least one second transaction.

In one embodiment of the instant invention, the at least one abnormal pattern is based on a number of times and on a frequency with which a cash in-cash out amount correlated with a particular play type and winnings In one embodiment of the instant invention, the at least one abnormal pattern relates to the player's usage of at least one bank account and at least one credit card account and is based on at least one of: i) the amount of each transactions; ii) a type of the usage; iii) a frequency of the usage; and iv) a frequency of change the at least one bank account or at least one credit card account.

In one embodiment of the instant invention, the at least one abnormal pattern relates to a frequency of changing player's profile and is based on a similarity between an old and a new profiles. In one embodiment of the instant invention, the at least one abnormal pattern is when a number of changes to the player's profile exceeds a predetermined change number for at least one the following categories of the personal information: a) password change frequency, b) credit card numbers or pointers to credit card numbers, c) account block or exclude, and d) play cancellation and amount of cancellation In one embodiment, the instant invention may include a programmed computer for detecting fraud than includes: memory having at least one region for storing computer executable program code; and a processor for executing the program code stored in the memory, wherein the program code includes: a) code to receive by the computer system from at least one source information regarding a plurality of played coupons for at least one game, wherein the plurality of played coupons comprises at least one first coupon and at least one second coupon; b) code to populate by the computer system at least one two-dimensional array for each played game from the received information, i) wherein the at least one two-dimensional array holds aggregated game statistics, and ii) wherein the aggregate statistics is user-defined and includes: 1) an identity of the at least one source, 2) the received information for the plurality of played coupons, and 3) at least one of: a) a frequency of at least one played amount, b) a number of cancelled coupons, c) a maximum coupon value played, and d) a maximum number of combinations per the at least one first coupon and the at least one second coupon; c) code to store by the computer system the at least one two-dimensional array with in at least one data structure; d) code to scan, using the received information for the at least one first coupon, by the computer system the at least one data structure to identify at least one abnormal pattern; e) code to generate, when the at least one abnormal pattern is identified, by the computer system an alert prior to a payout on the at least one first coupon; f) code to scan, using the received information for the at least one second coupon, by the computer system the at least one data structure to identify at least one abnormal pattern; and g) code to generate, when the at least one abnormal pattern is identified, by the computer system an alert prior to a payout on the at least one second coupon.

In one embodiment, the instant invention may include a programmed computer for detecting fraud that includes a memory having at least one region for storing computer executable program code; and a processor for executing the program code stored in the memory, wherein the program code includes: a) code to receive by the computer system from at least one source information about a plurality of transactions regarding at least one game, wherein the plurality of transactions comprises at least one first transaction and at least one second transaction; b) code to populate by the computer system at least one two-dimensional array for each player with information from the received plurality of transactions, i) wherein the at least one two-dimensional array holds aggregated game statistics regarding each player's participation in a particular game during at least one period of time, and ii) wherein the aggregate statistics is user-defined and comprises a distribution of cash in—cash out amounts per each play type played by the player, wherein the distribution is based on: 1) an amount of each transaction; 2) a largest amount from all cash in—cash out amounts; 3) a total number of transactions whose value was within a predetermined range; and 4) at least one transaction whose value was required official approval; c) code to store by the computer system the at least one two-dimensional array in at least one data structure; d) code to scan, using the received information for the at least one first transaction, by the computer system the at least one data structure to identify at least one abnormal pattern; e) code to generate, when the at least one abnormal pattern is identified, by the computer system an alert prior to a payout on the at least one first transaction; f) code to scan, using the received information for the at least one second transaction, by the computer system the at least one data structure to identify at least one abnormal pattern; and e) code to generate, when the at least one abnormal pattern is identified, by the computer system an alert prior to a payout on the at least one second transaction.

In some embodiments, the system and methods of the present invention may allow, as information about each played coupon is received, to analyze on a coupon-by-coupon basis and determine instantaneously, real-time, a presence of potentially abnormal, fraudulent, patterns/activities/trends while a game is proceeding and/or prior to a potential payout on the analyzed, played coupon. In some embodiments, the system and methods of the present invention may allow, as information about each played coupon is received, to automatically analyze on a coupon-by-coupon basis and determine instantaneously, real-time, a presence of potentially abnormal, fraudulent, patterns/activities/trends while a game is proceeding and/or prior to a potential payout on the analyzed, played coupon.

In some embodiments, the system and methods of the present invention provide the Abnormal Behavior Detection ("ABD") on pre-specified scenarios, that is already known cases of potential fraud alerts. In some embodiments, ABD may include actions from players, retailers and internal users that may represent, including but not limiting, attempts for multiple ticket validations (especially for Instant Gaming), unusual promotion scenarios, unusual win patterns, sales exceptions, suspicious betting pattern identification, and/or ticket cancelations. In some embodiments, ABD is used to detect "unlikely events" which may not be based on a-priori specified scenarios, but are rather based on unknown yet cases of potential fraud, by deploying, for example, statistical analysis, data mining and machine learning techniques. In some embodiments, noting cases of potential fraud, the system and methods of the present invention allow to the inventive system to "learn" fraud patterns.

In some embodiments, the instant invention further includes a Decision Support System (DSS) for Response which combines multiple events to derive a final alert and an ability to provide evidence (reasoning) which led to the final alert.

In some embodiments, the instant invention utilizes a Games Data Mapping that may translate any type of online chance game data collected from different countries internationally to a common data description format so that all subsequent algorithms for ABD and DSS are seamlessly executed without any modifications.

In some embodiments, the instant invention results in black-listing of players and/or IP addresses based on alerts raised from player behavior and/or group behavior, for example from specific Internet addresses and/or terminals.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Illustrative Operating Environment

Figure 1:
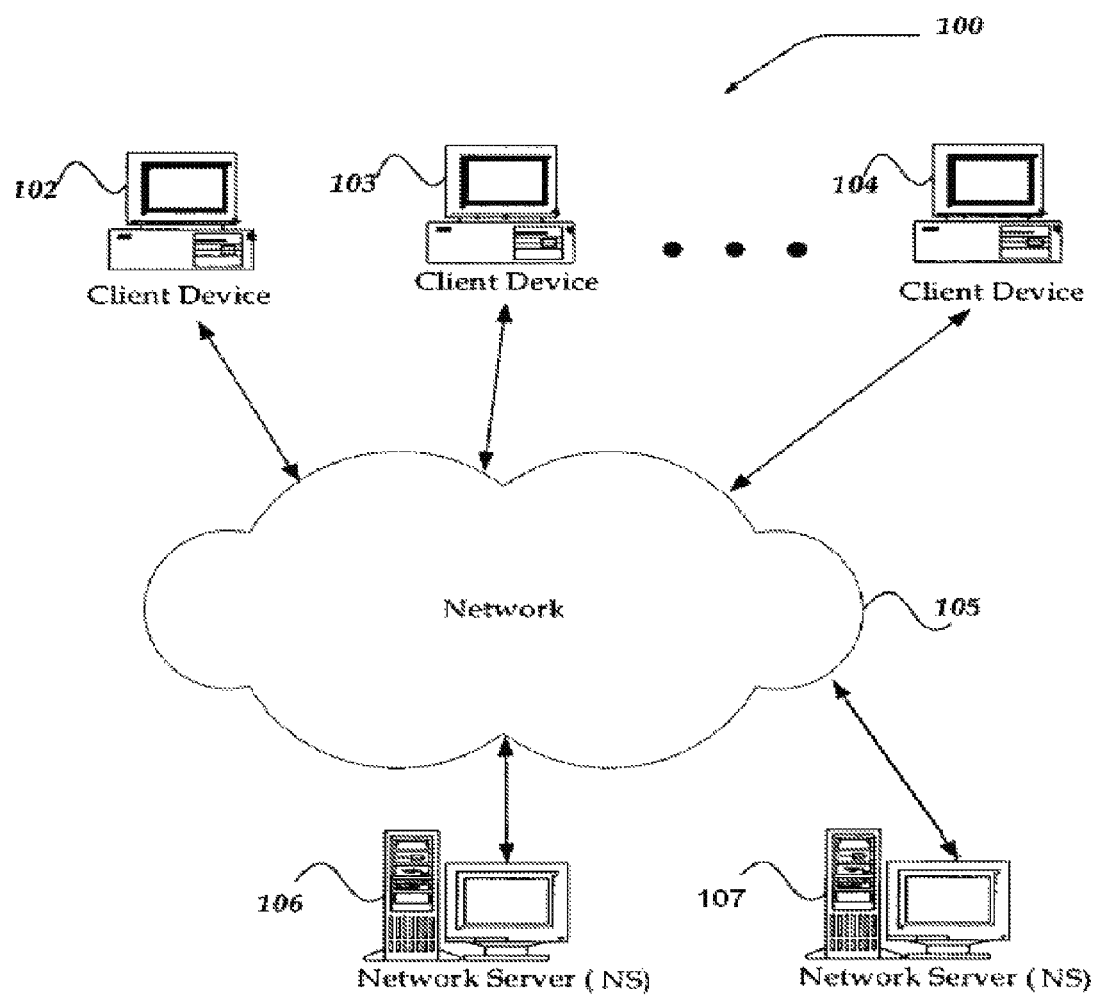
FIG. 1 shows a schematic of an embodiment of the present invention.

FIG. 1 illustrates one embodiment of an environment in which the present invention may operate. However, not all of these components may be required to practice the invention, and variations in the arrangement and type of the components may be made without departing from the spirit or scope of the invention. In some embodiment, the fraud detection system hosts a large number of members and concurrent transactions. In other embodiments, the fraud detection system computer is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. players, agents, etc.)) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
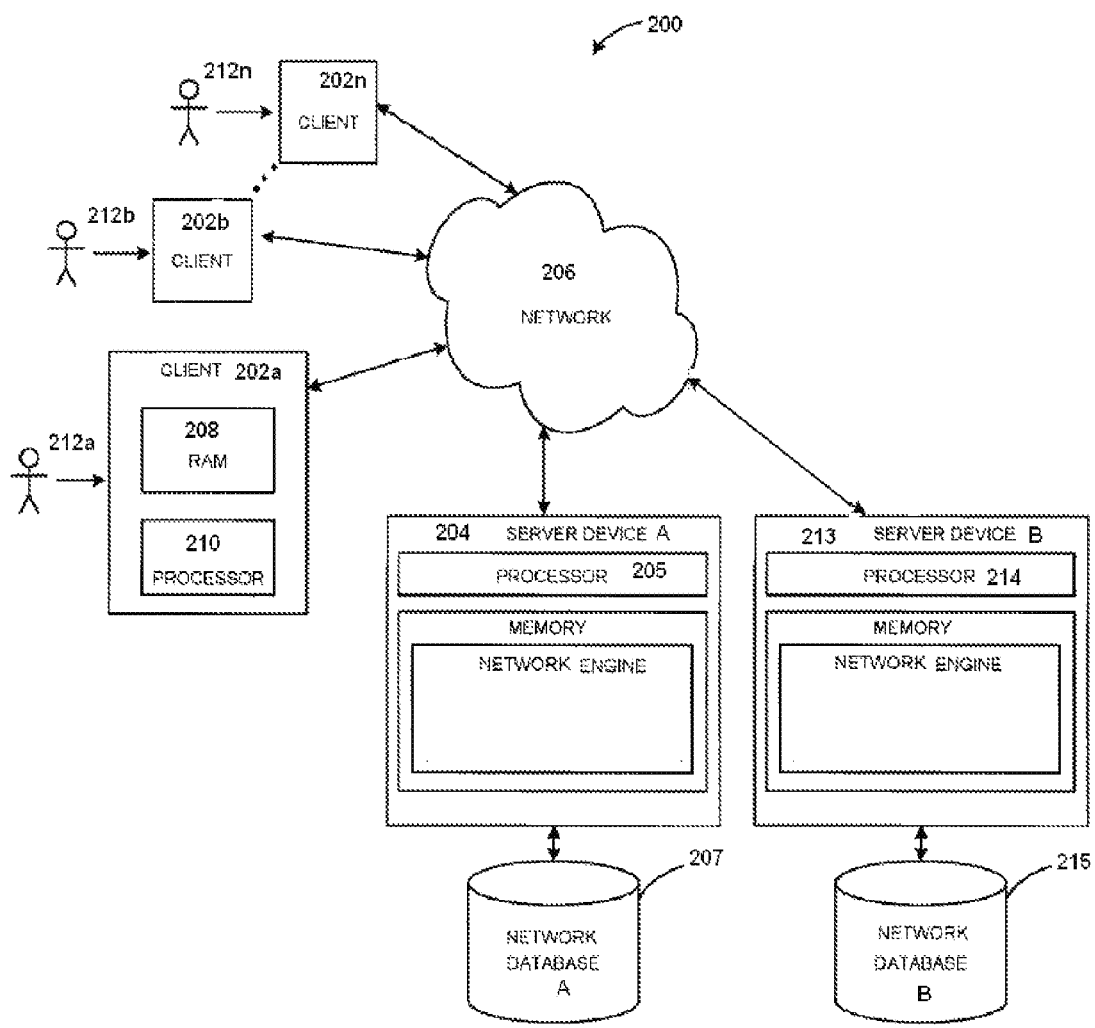
FIG. 2 shows a schematic of another embodiment of the present invention.

FIG. 2 shows another exemplary embodiment of the computer and network architecture that supports the inventive fraud detection system. The member devices 202a, 202b thru 202n shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera.

Through the client devices 202a-n, users (e.g. players, agents, etc.) 212a-n communicate over the network 206 with each other and with other systems and devices coupled to the network 206. As shown in FIG. 2, server devices 204 and 213 may be also coupled to the network 206.

Examples of Data Structures for Non-Internet-Gaming Data

In some embodiments, $\Delta t$ denotes the minimum length of time (time-quantum, or time period) within which statistics about a game g (lottery, betting, etc. . . . ) may be measured and stored. In some embodiments, as a default value, $\Delta t$ or T may be set to ½ hour (but is in general user-controlled through the system's GUI). In some embodiments, there is a 2-dimensional array $S^g(t, a)$ t=1, . . . $T_e$, a=1, . . . , $N_A$ where NA is the total number of agents (or groups of agents, if such a partitioning is known a-priori), and $T_e = (T_{end} - T_{start})/\Delta t$, the number of sampled periods, with Tstart being the time when the first coupon (or ticket) for game category g was played, and Tend being the time when the last coupon for the game category g was played in the available transactional data. In some embodiments, this array holds the following aggregate statistics for the coupons for game category g played in agent $\alpha$, within the time interval [t, t+$\Delta t$), denoted by t, measured for all t=1, . . . , Te.

1. The frequency (distribution) of amounts played. In some embodiments, this implies a quantization of the amount-played variable, which is also user-defined. In some embodiments, $\Delta m$ denotes the money-quantum used for the particular game (e.g. €50). In some embodiments, for each cell of the 2-D array $S_g(t, a)$, it may be maintained a data member _mDistro which is as follows: double_mDistro[Mmax/$\Delta m$] where Mmax-1 is the max. amount of money allowed to be played in the game without official approval, and the last element in the array holds all larger bets (that require official approval). In some embodiments, the size of mDistro is [Mmax/$\Delta m$]. In some embodiments, each cell holds the total number of coupons that were played for this game, and whose value was within the specified monetary amount interval n representing the interval [(n-1)$\Delta m$, n$\Delta m$), where n=1, . . . , [Mmax/$\Delta m$]

2. Number of cancelled coupons.

3. Max. coupon value played. In some embodiments, if player-id information was known, then this value may be substituted for the maximum of a player's amount for the game, independent of agent; but player-id does not exist yet.

4. max. number of combinations in played coupon so far.

In some embodiments, the above accounts for all necessary data for detecting the initially specified fraud scenarios. In some embodiments, the above detailed data structures and statistics could be extended to enhance the applicability of the proposed methodology to other aggregate statistics-based fraud cases detection.

In some embodiments, the data structures may be described in the pseudo-code as follows:

```
class S {
    final static double _Dt;
```

-continued

```
        final static double __Dm;
        final static double __Mmax;
        double __mdistro[__Mmax/__Dm];
        double __numCancelled;
        double __maxCombsInCouponPlayed;
        double __maxCouponValue;
        double __totCouponValue;
        long __numCoupons;
    };
    class StatsPerGame {
        final static double __totTime;
        final static double __numAgents;
        S __array[__totTime/S.__Dt][__numAgents];
        S __sumArray[__totTime/S.__Dt];
    };
```

In some embodiments, the _sumArray[ ] data member of the data structure StatsPerGame may aggregate the _array[ ] [ ] data member in the agent variable. In some embodiments, the StatsPerGame data structure may be completely populated using only a single scan of the input files.

Figure 3:
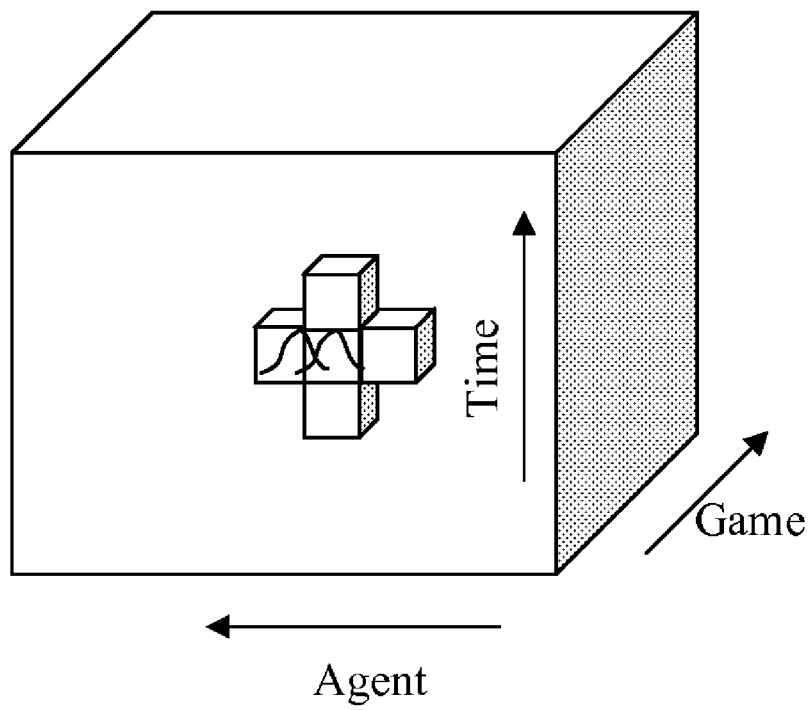
FIG. 3 shows a schematic of yet another embodiment of the present invention.

In some embodiments, FIG. 3 visualizes the data cube structure. In some embodiments, an algorithm of linear complexity may be optimal. For example, any algorithm has to read the input at least once, hence any linear time algorithm is considered optimal. In some embodiments, the above detailed information may remain in computer memory in order to speed up computation and avoid expensive disk-access operations.

In some embodiments, to achieve this optimal behavior, a one-time scan of all played coupons may be utilized to collect all the necessary information, as presented previously. In some embodiments, such information may present a first-level of "compactness" to allow for more compact representation of the initially provided transactional data. In some embodiments, based on the fraud cases at hand, the compact representation is optimal for their detection without any substantial information being lost during this process. In some embodiments, after the one-time scan gathered necessary information as detailed above, the instant invention allows to effectively answer queries that are relevant to the various fraud cases specified so far.

In some embodiments, for example, it may be easy to identify event E (say a match between two teams A and B) that is used to place a bet in a coupon C, the agent that filed this coupon and the amount M played.

In some embodiments, the system and methods of the present invention may allow, as information about each played coupon is received, to analyze on a coupon-by-coupon basis and determine instantaneously, real-time, a presence of potentially abnormal, fraudulent, patterns/activities/trends while a game is proceeding and/or prior to a potential payout on the analyzed, played coupon. In some embodiments, the system and methods of the present invention may allow, as information about each played coupon is received, to automatically analyze on a coupon-by-coupon basis and determine instantaneously, real-time, a presence of potentially abnormal, fraudulent, patterns/activities/trends while a game is proceeding and/or prior to a potential payout on the analyzed, played coupon.

Abnormal patterns/activities/trends/conditions are situations that create a suspicion that a fraudulent activity may have occurred or about to occur, and/or create a apprehension of a vulnerability that may allow a fraudulent activity to take place. Below are embodiments of the present invention illustrating the claim requirement of "at least one abnormal pattern is identified."

Examples of Identifying and Preventing Fraud in Non-Internet-Based Lottery and Betting Games Scenario 1: % Percentage of Player Gross Amount/Total Gross Amounts in a Betting Game The following is one example that how a particular abnormal pattern may be identified. In some embodiments, when dealing with anonymous coupons, the player-id information is not given in the input files. The present invention allows to check whether the ratio of a coupon-gross-amount for any random player over the total gross amount for all players in a game exceeds a threshold by computing for a particular game the ratio of a maximum coupon(ticket)-gross-amount played for that game (e.g. maximum amount bet per a ticket) over total gross-amount for that game (sum of amounts of all coupons (tickets) played during that game. In some embodiments, if that ratio exceeds a (administrator-defined) threshold, an ALERT, indicative of a potentially abnormal, fraudulent behavior/condition, is raised citing the offending coupon.

In some embodiments, to implement this scenario, the following double for-loop may be used:

```
Begin;
M = 0;
Sum=0;
for t=1,...Te do
    for a=1...NA do
        if StatsPerGame.__array[t][a].__maxCouponValue > M
            M = StatsPerGame.__array[t][a].__maxCouponValue;
        endif;
        Sum += StatsPerGame.__array[t][a].__totCouponValue;
    endfor;
endfor;
if M/Sum > threshold ALERT;
End;
```

Scenario 2: Many Identical Winning Combinations of Bettings (Systems) for the Same Agent The following is one example that how a particular abnormal pattern may be identified. In some embodiments, input information may be information about played coupons. In some embodiments, output information may identify the "identical" combinations of betting that come from the same agent. In some embodiments, such output information may essentially correspond to matches that have been "fixed" in advance. In some embodiments, this scenario tests for a presence of a combination in a particular coupon/ticket that has been played from the same agent many more times than the statistical expectation for this combination. In some embodiments, to eliminate a need for checking each coupon combination against every other coupon combination, the present invention applies a hash function to a byte stream of the particular coupon, representing a combination played in the coupon, to produce a hash value representing the particular coupon. In some embodiments, the generated hash value is then stored in two hash-tables in a database, along with the number of appearances of that value in the coupons played. In some embodiments, from the two hash-tables, —the first hash table corresponds to coupons/tickets played from the agent where the coupon was cast/sold, and the second hash table corresponds to the sum of coupons/tickets from all agents. In some embodiments, if the ratio of appearances of any similar or identical hash values against the total coupons played for a given game exceeds an administrator-defined threshold, an ALERT, indicative of a potentially abnormal, fraudulent behavior, is generated with information about potentially fraudulent coupons/tickets.

The determination in accordance with the instant invention may include, but not limiting to, the following sequence of steps:

```
For every coupon C
    if (amount M is in the range [M1, M2]) then do the
following:
        Identify the event E from coupon (E relates to a
specific played combination, or to a pool of similar ones (i.e. differing
very slightly)
        Set h = hash(E)
        Place the coupon in a bucket B[h]
        End-if
    End-for
```

In some embodiments, when looking for cases of fixed events (e.g. events whose outcome is known in advance and whose outcome corresponds to "valid" games/combinations offered for play), the instant invention may only consider coupons whose amount is above a certain threshold. In some embodiments, for those coupons that belong in the range [M1, M2]—parameters that can be determined in advance—the instant invention may collect all identical events.

In some embodiments, to accomplish the collection step, the present invention hash the event information to get back a numerical value h=hash(E). In some embodiments, the hash value may be used to place the coupon (or a link to the coupon) inside a bucket array B[ ] whose length may be determined by the output range of the hash function. In some embodiments, the preceding approach allows to substantially limit the data space representation size and easily pinpoint to similar events, in terms of close hash function outputs. In some embodiments, the length of the array may be a design parameter that depends on available memory and can be fixed in advance.

In some embodiments, the instant invention allows to complete the collecting scan for every coupon C within a single pass. In some embodiments, the collected information in buckets may contain identical bets whose amount is in the range [M1, M2], for example above 500 Euros. In some embodiments, the instant invention allows to locate identical combinations by simply looking at the coupons that reside in each bucket.

In some embodiments, the instant invention may minimizes collisions (e.g. significantly different bets that hash to the same bucket), by carefully defining the hash function and the length of the bucket array. In some embodiments, a suitable choice of hash function may include, but not limiting to, cryptographic hash functions and/or simple functions that perform modular arithmetic. In some embodiments, the consideration of amounts greater than a specific amount may also decrease the chance of collisions. In some embodiments, the instant invention may first clusters coupons based on the coupon amount. In some embodiments, the instant invention may second apply the hash function to each cluster of similar amount coupons, to identify coupons with similar combinations. In some embodiments, the instant invention may apply an additional constraint for this scenario by having the same agent Id (which may further partition the initial clusters to smaller ones). In some embodiments, this partitioning may further reduce the risk of collisions.

Scenario 3: Many Identical Combinations of Bettings (Systems) from Many Agents

The following is one example that how a particular abnormal pattern may be identified. In some embodiments, this scenario tests for a presence of a combination in a particular coupon/ticket that has been played from multiple agents many more times than the statistical expectation for this combination. In some embodiments, to eliminate a need for checking each coupon combination against every other coupon combination, the present invention applies a hash function to a byte stream of the particular coupon, representing a combination played in the coupon, to produce a hash value representing the particular coupon. In some embodiments, the generated hash value is then stored in two hash-tables in a database, along with the number of appearances of that value in the coupons played.

In some embodiments, from the two hash-tables, —the first hash table corresponds to coupons/tickets played from the agent where the coupon was cast/sold, and the second hash table corresponds to the sum of coupons/tickets from all agents. In some embodiments, if the ratio of appearances of any similar or identical hash values against the total coupons played for a given game exceeds an administrator-defined threshold, an ALERT, indicative of a potentially abnormal, fraudulent behavior/condition, is generated with information about potentially fraudulent coupons/tickets. In some embodiments, the methods and the system used to identify potentially fraudulent trends in the scenario 2 may also be implemented to address scenario 3. In some embodiments, the present invention identifies a combination in a particular coupon/ticket that has been played from multiple agents many more times than the statistical expectation for this combination because a bucket may contain identical bets, irrespective of the agent, that was used to file the coupon. In some embodiments, simply looking at a specific bucket may provide additional information about potentially collaborating agents.

Scenario 4: Increased Cancellation Frequency in a Betting Game and/or a Lottery Game The following is one example that how a particular abnormal pattern may be identified. In some embodiments, the present invention computes a percentage of coupon cancellations over total coupons played from any given agent within an administrator-defined time interval. In some embodiments, if the percentage is sufficiently above the average cancellation rate for all agents within the given time-interval and for all games, ("sufficiently above" is defined by an administrator-defined threshold that multiplies the average global cancellation rate during the specified time-interval), an ALERT, indicative of a potentially abnormal, fraudulent behavior/condition, is generated with information about potentially offending agent(s). In some embodiments, the following for-loop may be used to detect fraud in this scenario (e.g. finding an average frequency of cancellations among all agents and per a specific agent):

```
Begin
numc=0;
for a=1...NA do
    numc_a[a] = 0;
    endfor;
    for t=1...Te do
        numc += StatsPerGame._sumArray[t].numCancelled;
        for a=1...NA do
            numc_a[a]+=StatsPerGame._array[t][a].numCancelled;
    endfor;
    endfor;
```

In some embodiments, the instant invention may check the collected information using the following procedure:

```
avg_freq = numc / (Te*NA);
for t=1... Te do
    for a=1... NA do
        if StatsPerGame._array[t][a]._numCancelled >
                avg_freq*(1+user-defined-threshold)
            ALERT;
        endfor;
endfor;
```

In some embodiments, the instant invention may use a mixed solution by performing scans within a certain timeframe before each game closes. For example:

```
avg_freq = numc / (Te*NA);
    or a=1... NA do
        if numc_a[a] >
                avg_freq*(1+user-defined-threshold)
            ALERT (output agent Id → a);
        endfor;
End.
```

Scenario 5: A Ratio of Game Participation in a Particular Betting or Lottery Game to a Total Participation in All Games The following is one example that how a particular abnormal pattern may be identified. In some embodiments, the instant invention may track a participation in a particular game to total participation in all games. In some embodiments, the instant invention estimates whether a ratio of coupons/tickets played from all agents for a given game over a total number of coupons/tickets played from all agents during an administrator-defined time-interval exceeds an administrator-defined threshold. In some embodiments, the instant invention generates an ALERT, indicative of a potentially abnormal, fraudulent behavior/condition, containing information about the potentially offending, fraudulent game.

In some embodiments, the instant invention may produce an alert if the game participation is above certain threshold (e.g. >20%). In some embodiments, the instant invention may produce an alert if the game participation is above certain threshold within a certain timeframe (e.g. within a half an hour timeframe).

In some embodiments, the instant invention may include, but not limiting to, the following pseudo code to identify fraud based on tracking game participation:

```
Begin
for each t=1... Te do
    tot_part = 0;
    for each game g active in [t,t+Δt) do
        tot_part += StatsPerGame[g]._sumArray[t].numCoupons;
    endfor;
    for each game g active in [t,t+Δt) do
        if StatsPerGame[g]._sumArray[t].numCoupons >
                tot_part*user_defined_threshold
            ALERT;
    endfor;
End;
```

Scenario 6: Playing Different Combinations in a Coupon/Ticket of a Lottery Game or a Betting Game The following is one example that how a particular abnormal pattern may be identified. In some embodiments, the instant invention may allow detecting a fraud in situations when bets are placed for more than one combination in a coupon (e.g. 40% of all possible combinations in a coupon, all possible combinations in a coupon) (e.g. potentially money laundering activities). In some embodiments, the instant invention computes a total number of combinations present in a coupon/ticket played by reading the played value of the coupon/ticket and dividing the played value by value of possible combinations (e.g. value of all combinations in a single column). In some embodiments, if the resulted number is above an administrator-defined threshold, an ALERT, indicative of a potentially abnormal, fraudulent behavior/condition, is generated with information about a potentially offending coupon/ticket.

In some embodiments, the instant invention may include, but not limiting to, the following pseudocode to identify a potential fraud case:

```
Begin
For t=1... Te do
    If StatsPerGame._sumArray[t].maxCombsInCouponPlayed >
            threshold
        ALERT;
endfor;
End;
```

Scenario 7: Playing Different Combinations of the Same Amount in a Lottery Game or a Betting Game The following is one example that how a particular abnormal pattern may be identified. In some embodiments, the instant invention may allow detecting a fraud in situations when bets of the same amount are placed using more than one coupon/ticket. In some embodiments, the instant invention may allow detecting a fraud in situations when bets of the same amount are placed using more than one coupon/ticket sold by the same agent. In some embodiments, the instant invention may allow detecting a fraud in situations when bets of the same amount are placed using more than one coupon/ticket sold by different agents. In some embodiments, the instant invention hashes a value of each coupon/ticket of a selected game into buckets of hash-values in a manner which is similar to examples detailed with respect to the Scenario 2. In some embodiments, buckets with hash values represent pairs of values (e.g. hash-value, num-coupons-hashing-into-that-value). In some embodiments, if in the end of a scan of the input data, the instant invention identifies a key-value pair with a value above an administrator-defined threshold, then an ALERT, indicative of a potentially abnormal, fraudulent behavior/condition, is generated having information about the potentially fraudulent coupon/ticket.

In some embodiments, the instant invention may include, but not limiting to, the following pseudocode to identify a potential fraud case in these scenarios:

```
Begin
totc=0;
for each t=1... Te do
    totc += StatsPerGame._sumArray[t]._numCoupons;
endfor;
avg_freq = totc/NA;
for each a=1... NA do
    double freqs = 0; // init. to zero
    for each m=1... Mmax/Δm do
        for each t=1... Te do
            freqs += StatsPerGame._array[t][a]._mdistro[m];
        endfor;
        if freqs > avg_freq*threshold ALERT;
    endfor;
endfor;
End;
```

In some embodiments, the instant invention may allow detecting a fraud in situations when bets of the same amount are placed using more than one coupon by using the hash-function to hash a particular coupon into a collection of buckets. For example, the hashing of the coupon may be performed as described for scenarios 2 and 3 above. In some embodiments, the instant invention may allow hashing each coupon read into a value using, for example, an amount of money played and/or the agent id. In some embodiments, the buckets may hold pairs of the form. In some embodiments, an example of a pair of the form may include, but not limiting to, a hash-value and a num-coupons-hashing-into-that-value. In some embodiments, if in the end of the scan the instant invention identifies a key-value pair with a value that is too high based on initial settings for the scan, the instant invention may issue an ALERT.

Scenario 8: Continuous Playing a Lottery Game or a Betting Game with an Amount that is a Little-Less than a Limit.

The following is one example that how a particular abnormal pattern may be identified. In some embodiments, the instant invention may allow detecting a fraud in situations when there may be continuous playing with an amount that is a little-less than a limit. In some embodiments, similarly to hashing calculations performed with respect to Scenario 7, the instant invention hashes values of coupon/tickets into pairs of hash values for coupons that have values that fall within a pre-determined value-range. In some embodiments, the present invention may be adapted to detect continuous playing below the limit from a single agent. In some embodiments, if a variance of the values in the distribution of amounts played for a given game in the interval [m-v,Mmax] (where m is essentially the coupon-value limit, and v is some user-defined (presumably small) integer) is significant and there exists an agent a, for whom the number of coupons played immediately below the limit is above an average for all other agents, the present invention generates an ALERT, indicative of a potentially abnormal, fraudulent behavior/condition, having information about the potentially offending agent(s).

In some embodiments, detecting a fraud based on continuous playing with an amount that is a little-less than a limit may include, but not limiting to, the following pseudocode:

```
Begin
  m = cell-index in _mdistro histogram that corresponds to amount
  little-less than the limit
  sum = 0;
  for t=1... Te do
    sum += StatsPerGame._sumArray[t]._mdistro[m];
  endfor;
  if sum > threshold ALERT;
End;
```

In some embodiments, the instant invention may issue another alert independent of the user-defined threshold as follows. If the variance of the values in StatsPerGame._sumArray[t]._mdistro in the interval [m-v,Mmax], where v is some user-defined (presumably small) integer and is significant, and where there is an agent a, for whom the StatsPerGame._array[t][a]._mdistro[m] array value is above a factor of the average of this value for all other agents, then the instant invention may issue an ALERT (continuous playing from a given agent).

Scenario 9: Claiming Unpaid Coupons/Tickets During the Last Days Before Expiration of a Lottery Game or a Betting Game.

The following is one example that how a particular abnormal pattern may be identified. In some embodiments, when investigating near-to-expire unclaimed winning prizes, the instant invention may allow to identify a fraud or alert about a potential fraud by checking, for example, at least the following values for all winning tickets: draw number and date, ticket pointer (indirect identifier). In some embodiments, when, in accordance with the instant invention, the ticket is near the expiration date, an alert is produced.

In some embodiments, the instant invention includes a method to detect fraud performed in a computing system that includes receiving by the computer system from a plurality of sources information regarding at least one played coupon for at least one betting game, wherein the received information corresponds to at least one period of time during which the at least one betting game is played; populating by the computer system at least one two-dimensional array for each played betting game from the received information, wherein the at least one two-dimensional array holds aggregated game statistics regarding the at least one played coupon sold by at least one agent during the at least one period of time, and wherein the aggregate statistics is user-defined and comprises at least one of: 1) a frequency of at least one played amount, 2) a number of cancelled coupons, 3) a maximum coupon value played, and 4) a maximum number of combinations per the at least one coupon; storing by the computer system the at least one two-dimensional array in at least one data structure; scanning by the computer system the at least one data structure to identify at least one abnormal pattern; and e) generating by the computer system an alert when the at least one abnormal pattern is identified.

In some embodiments, an abnormal pattern is when a ratio of a coupon gross amount for a random player to a total gross amount for all players in the at least one game exceeds a predetermined ratio amount.

In some embodiments, the instant invention further includes identifying by the computer system a first suspected coupon and a second suspected coupon, wherein a suspected coupon is the at least one played coupon whose played amount exceeds a predetermined played threshold amount; hashing by the computer system the aggregate statistics regarding the first suspected coupon to generate a first hash value; hashing by the computer system the aggregate statistics regarding the second suspected coupon to generate a second hash value; aggregating by the computer system the first and the second hash values when a length of the first hash value differs from a length of the second hash value by less than a predefined difference number; and scanning, when a length of the first hash value differs from a length of the second hash value by less than a predefined difference number, by the computer system the aggregate statistics regarding the first and the second suspected coupons, wherein the at least one abnormal pattern is a presence of similar betting combinations from the same at least one agent.

Examples of Data Structures for Internet-Gaming Data

In some embodiments, the data structures maintained for Internet Gaming may be very similar and completely analogous to the data cube described with respect to Non-Internet-Gaming, as depicted in FIG. 3.

In some embodiments, time may be coarse-grained in order to reduce the amount of data stored in main memory. In some embodiments, $\Delta t$ denotes the minimum length of time (time-quantum) within which statistics about a player P may be stored. In some embodiments, as a default value, $\Delta t$ can be set to 1 hour or 1 day whichever is more appropriate based on level of detail required. In some embodiments, for example, for every player P, a 2-dimensional array $S^P(t,g)$, $t=1, \ldots T_e$, $g=1, \ldots N_g$ may be used, where $N_g$ denotes the different play types, and $T_e=(T_{end}-T_{start})/\Delta t$ with $T_{start}$ and $T_{end}$ identify the time intervals for which statistics is collected. In some embodiments, this above array may hold the following aggregate statistics for a particular play type g within time interval $[t, t+\Delta t]$:

1. The distribution of amounts for cash in—cash out. In some embodiments, this characteristic implies a quantization of the amount-played variable, which may also be user-defined. In some embodiments, $\Delta m$ denote the money-quantum that is used for the particular transaction (e.g. € 10). In some embodiments, $\Delta m$ can be set equal to 1. In some embodiments, for each cell of the 2-D array $S^P(t, g)$, a data member may be maintained. In some embodiments, _mDistro may be double _mDistro[$M_{max}/\Delta m$], where $M_{max}$-1 may be the largest known amount of money used for cash in—cash out. In some embodiments, the last element in the array may hold all larger bets that require official approval. In some embodiments, each cell may hold the total number of transactions whose value, for example, was within the specified monetary amount.

In some embodiments, the instant invention includes a method to detect fraud performed in a computing system that includes receiving by the computer system from at least one source a plurality of transactions regarding at least one betting game, wherein the received plurality of transactions corresponds to at least one period of time during which the at least one betting game has been played; populating by the computer system at least one two-dimensional array for each player with information from the received plurality of transactions, i) wherein the at least one two-dimensional array holds aggregated game statistics regarding each player's participation in a particular betting game during the at least one period of time, and ii) wherein the aggregate statistics is user-defined and comprises a distribution of cash in—cash out amounts per each play type played by the player, wherein the distribution is based on: 1) an amount of each transaction; 2) a largest amount from all cash in—cash out amounts; 3) a total number of transactions whose value was within a predetermined range; and 4) at least one transaction whose value was required official approval; storing by the computer system the at least one two-dimensional array in at least one data structure; scanning by the computer system the at least one data structure to identify at least one abnormal pattern; and generating by the computer system an alert when the at least one abnormal pattern is identified.

In some embodiments, the data structures can be represented by the following pseudo-code:

```
class S {
    final static double __Dt;
    final static double __Dm;
    final static double __Mmax;
    double __mdistro[__Mmax/__Dm];
};
class StatsPerPlayer {
    final static double __totTime;
    final static double __numPlayTypes;
    S __array[__totTime/S.__Dt][__ numPlayTypes];
};
```

Examples of Identifying and Preventing Fraud in Internet-Based Lottery and Betting Games Below are embodiments of the present invention illustrating the claim requirement of "at least one abnormal pattern is identified."

Scenario 1

Financial Transactions Subcategory 1: Number of Times and Frequency/Amount for Cash In—Cash Out.

The following is one example that how a particular abnormal pattern may be identified. In some embodiments, the instant invention may allow to correlate a number of times and/or a frequency and/or an amount of cash in—cash out with a play type and/or winnings In some embodiments, the instant invention may allow on a player-by-player basis and/or play type basis to access the corresponding cell in $[t, t+\Delta t]$ and increase the value of _mDistro[Mmax/$\Delta$m].

In some embodiments, the data may be visualized using an appropriate histogram to highlight amounts of cash in—cash out for a particular user and/or a specific duration. In some embodiments, parameters such as Starting and/or Ending date provide time granularity on which all events may be bundled together. In some embodiments, a user may set a minimum amount.

In some embodiments, the instant invention may allow to generate cumulative histograms of the above mentioned quantities that show the function x(t) as well as the function $$\int_0^t x(z)\,dz.$$

Financial Transactions Subcategory 2: Use of Bank Accounts and Credit Cards

The following is one example that how a particular abnormal pattern may be identified. In some embodiments, the instant invention may allow to identify fraud regarding a use of bank accounts and credit cards. In some embodiments, the fraud may be identified based on an amount per time and a type and/or frequency of use and change. In some embodiments, the instant invention may allow to generate a histogram to visualize the collected data. In some embodiments, once the Starting and/or Ending date, and the time granularity are set, information may be displayed regarding the amount and the account used (bank or credit). In some embodiments, visualizations may include, but not limiting to, visualizations of time-series for: cash-in, cash-out, play, winning amounts, cross-correlation, auto-correlation, and/or dependency between any pair of these time-series, and cumulative time-series (e.g. total cash-out since beginning of time). In some embodiments, the instant invention may allow to generate an alert when impossible patterns are identified. For example, one impossible pattern may be a pattern when a total-cash-out exceeds a total-cash-in plus winnings at any point in time.

Scenario 2: Abuse of Promotions—Gifts

The following is one example that how a particular abnormal pattern may be identified. In some embodiments, the instant invention may allow to identify fraud regarding promotions. For example, in some embodiments, for every player, the instant invention may use data about a frequency of participation in promotions and a value of gift certificates to identifying possible internal fraud. In some embodiments, the instant invention may utilize approaches discusses with respect to the first scenario for detecting Internet based fraud by considering a gift certificate to be similar to a play type.

Scenario 3: Registration
Subcategory 1: Frequency of Changes of Personal Information The following is one example that how a particular abnormal pattern may be identified. In some embodiments, the instant invention may allow to identify fraud based on a frequency of changes of personal information: e-mail, resident details, contact details, etc by, for example, keeping a counter for each category that is updated every time a change occurs.

Subcategory 2: Use of Similar Profiles.

The following is one example that how a particular abnormal pattern may be identified. In some embodiments, the instant invention may allow to identify fraud based on use of similar profiles by utilizing an algorithm based on Dynamic Programming. In some embodiments, the algorithm may determine the "distance" between two strings as a measure of a minimum number of "character edit operations" that is needed to turn one sequence into the other. In some embodiments, strings may be two different profiles (for example, a profile may contain more than simply the name of the user). In some embodiments, "similarity" between strings may have levels:

Identical—when the edit distance is zero,
Nearly Identical—when the edit distance, for example, is less than 3 operations,
Similar—when the edit distance is between 4 and 7, and etc.

In some embodiments, based on given two strings (e.g. profiles) s and t having a length m and n respectively, the instant invention may include, but not limiting to, the following set of operations:

Copy (i.e. use as is) character from s over to t (cost 0)
  Delete a character in s (cost 1)
  Insert a character in t (cost 1)
  Substitute one character for another (cost 1)

In some embodiments, the instant invention may additionally use a cost of a Partial Solution, i.e. let C[i, j]=cost, for correlating the first i characters of s with the first j characters of t. In some embodiments, C[i, j] may be defined in terms of previous values by maintaining a two-dimensional m×n table where the instant invention may record the values of C[k, l] for all k<i and l>j, as follows:

$$C[i, j] = \min \begin{cases} C[i-1, j-1] & \text{if } s[i] = t[j], \text{ i.e. copy last char} \\ C[i-1, j-1] + 1 & \text{if } s[i] \ne t[j], \text{ i.e. substitute} \\ C[i-1, j] + 1 & \text{i.e. delete } s[i] \\ C[i, j-1] + 1 & \text{i.e. insert } t[j] \end{cases}$$

In some embodiments, the instant invention may initialize the table using C[0, j]=j and C[i, 0]=i for all i≦m and j≦n. In some embodiments, the instant invention may use 2 for-loops to fill the table entries according to the above equation. In some embodiments, the Edit Distance is simply the entry C[m, n] of the matrix. In some embodiments, the complexity may be given by a time (O(m·n)) that may be necessary to fill the matrix.

Scenario 4: Profile Change Monitoring

The following is one example that how a particular abnormal pattern may be identified. In some embodiments, the instant invention may allow to identify fraud based on monitoring changes in user profiles. In some embodiments, the instant invention may keep a counter for each category that is updated every time a change occurs. In some embodiments, the instant invention may provide the corresponding alert when abnormal profile changes are identified. In some embodiments, the instant invention may monitor changes in user profiles based categories that include, but not limiting to, the following at least one of:

a) password change frequency
  b) credit card numbers or pointers to credit card numbers
  c) account block or exclude, and/or
  d) play cancellation and amount of cancellation In one embodiment, the instant invention may include a method to detect fraud performed in a computing system that includes a) receiving by the computer system from at least one source information regarding a plurality of played coupons for at least one game, wherein the plurality of played coupons comprises at least one first coupon and at least one second coupon; b) populating by the computer system at least one two-dimensional array for each played game from the received information, i) wherein the at least one two-dimensional array holds aggregated game statistics, and ii) wherein the aggregate statistics is user-defined and includes: 1) an identity of the at least one source, 2) the received information for the plurality of played coupons, and 3) at least one of: a) a frequency of at least one played amount, b) a number of cancelled coupons, c) a maximum coupon value played, and d) a maximum number of combinations per the at least one first coupon and the at least one second coupon; c) storing by the computer system the at least one two-dimensional array with in at least one data structure; d) scanning, using the received information for the at least one first coupon, by the computer system the at least one data structure to identify at least one abnormal pattern; e) generating, when the at least one abnormal pattern is identified, by the computer system an alert prior to a payout on the at least one first coupon; f) scanning, using the received information for the at least one second coupon, by the computer system the at least one data structure to identify at least one abnormal pattern; and g) generating, when the at least one abnormal pattern is identified, by the computer system an alert prior to a payout on the at least one second coupon.

In one embodiment of the instant invention, the at least one abnormal pattern is when a ratio of a coupon gross amount for a random player to a total gross amount for all players in the at least one game exceeds a predetermined ratio amount.

In one embodiment of the instant invention, the step of scanning by the computer system further comprises: identifying by the computer system a first suspected coupon and a second suspected coupon, wherein a suspected coupon is the at least one played coupon whose played amount exceeds a predetermined played threshold amount; hashing by the computer system the aggregate statistics regarding the first suspected coupon to generate a first hash value; hashing by the computer system the aggregate statistics regarding the second suspected coupon to generate a second hash value; aggregating by the computer system the first and the second hash values when a length of the first hash value differs from a length of the second hash value by less than a predefined difference number; and scanning, when a length of the first hash value differs from a length of the second hash value by less than a predefined difference number, by the computer system the aggregate statistics regarding the first and the second suspected coupons, wherein the at least one abnormal pattern is a presence of similar betting combinations from the same at least one agent.

In one embodiment of the instant invention, the at least one abnormal pattern is a presence of similar betting combinations from at least two agents. In one embodiment of the instant invention, the at least one abnormal pattern is when a frequency of cancellations for the at least one agent exceeds a predetermined cancellation frequency threshold number.

In one embodiment of the instant invention, the at least one abnormal pattern is when a percentage of participation in the at least one game during a sampled time period to a total participation in the at least one game exceeds a predetermined participation percentage. In one embodiment of the instant invention, the at least one abnormal pattern is when the at least one played coupon includes bets for all played combinations in the at least one played coupon.

In one embodiment of the instant invention, the at least one abnormal pattern is when a plurality of the played coupons sold by the same agent include bets having the same amount placed for all played combinations. In one embodiment of the instant invention, the at least one abnormal pattern is when a plurality of the played coupons sold by a plurality of the agents include bets having the same amount placed for all played combinations.

In one embodiment of the instant invention, the at least one abnormal pattern is when a plurality of the played coupons sold by the same agent include bets having the same amount placed for all played combinations. In one embodiment of the instant invention, the at least one abnormal pattern is when a plurality of the played coupons sold by a plurality of the agents include bets having the same amount placed for all played combinations.

In one embodiment of the instant invention, the at least one abnormal pattern is when a plurality of the played coupons sold by the same agent include bets having amounts that are less than a limit amount by less than a predetermined deviation amount. In one embodiment of the instant invention, the at least one abnormal pattern is when the at least one played coupon is a winning coupon and wherein the winning coupon is received for payment during a predetermined period prior to an expiration date of the wining coupon.

In one embodiment, the instant invention may include a method to detect fraud performed in a computing system, that includes: a) receiving by the computer system from at least one source information about a plurality of transactions regarding at least one game, wherein the plurality of transactions comprises at least one first transaction and at least one second transaction; b) populating by the computer system at least one two-dimensional array for each player with information from the received plurality of transactions, i) wherein the at least one two-dimensional array holds aggregated game statistics regarding each player's participation in a particular game during at least one period of time, and ii) wherein the aggregate statistics is user-defined and comprises a distribution of cash in—cash out amounts per each play type played by the player, wherein the distribution is based on: 1) an amount of each transaction; 2) a largest amount from all cash in—cash out amounts; 3) a total number of transactions whose value was within a predetermined range; and 4) at least one transaction whose value was required official approval; c) storing by the computer system the at least one two-dimensional array in at least one data structure; d) scanning, using the received information for the at least one first transaction, by the computer system the at least one data structure to identify at least one abnormal pattern; e) generating, when the at least one abnormal pattern is identified, by the computer system an alert prior to a payout on the at least one first transaction; f) scanning, using the received information for the at least one second transaction, by the computer system the at least one data structure to identify at least one abnormal pattern; and e) generating, when the at least one abnormal pattern is identified, by the computer system an alert prior to a payout on the at least one second transaction.

In one embodiment of the instant invention, the at least one abnormal pattern is based on a number of times and on a frequency with which a cash in-cash out amount correlated with a particular play type and winnings In one embodiment of the instant invention, the at least one abnormal pattern relates to the player's usage of at least one bank account and at least one credit card account and is based on at least one of: i) the amount of each transactions; ii) a type of the usage; iii) a frequency of the usage; and iv) a frequency of change the at least one bank account or at least one credit card account.

In one embodiment of the instant invention, the at least one abnormal pattern relates to a frequency of changing player's profile and is based on a similarity between an old and a new profiles. In one embodiment of the instant invention, the at least one abnormal pattern is when a number of changes to the player's profile exceeds a predetermined change number for at least one the following categories of the personal information: a) password change frequency, b) credit card numbers or pointers to credit card numbers, c) account block or exclude, and d) play cancellation and amount of cancellation In one embodiment, the instant invention may include a programmed computer for detecting fraud than includes: memory having at least one region for storing computer executable program code; and a processor for executing the program code stored in the memory, wherein the program code includes: a) code to receive by the computer system from at least one source information regarding a plurality of played coupons for at least one game, wherein the plurality of played coupons comprises at least one first coupon and at least one second coupon; b) code to populate by the computer system at least one two-dimensional array for each played game from the received information, i) wherein the at least one two-dimensional array holds aggregated game statistics, and ii) wherein the aggregate statistics is user-defined and includes: 1) an identity of the at least one source, 2) the received information for the plurality of played coupons, and 3) at least one of: a) a frequency of at least one played amount, b) a number of cancelled coupons, c) a maximum coupon value played, and d) a maximum number of combinations per the at least one first coupon and the at least one second coupon; c) code to store by the computer system the at least one two-dimensional array with in at least one data structure; d) code to scan, using the received information for the at least one first coupon, by the computer system the at least one data structure to identify at least one abnormal pattern; e) code to generate, when the at least one abnormal pattern is identified, by the computer system an alert prior to a payout on the at least one first coupon; f) code to scan, using the received information for the at least one second coupon, by the computer system the at least one data structure to identify at least one abnormal pattern; and g) code to generate, when the at least one abnormal pattern is identified, by the computer system an alert prior to a payout on the at least one second coupon.

In one embodiment, the instant invention may include a programmed computer for detecting fraud that includes a memory having at least one region for storing computer executable program code; and a processor for executing the program code stored in the memory, wherein the program code includes: a) code to receive by the computer system from at least one source information about a plurality of transactions regarding at least one game, wherein the plurality of transactions comprises at least one first transaction and at least one second transaction; b) code to populate by the computer system at least one two-dimensional array for each player with information from the received plurality of transactions, i) wherein the at least one two-dimensional array holds aggregated game statistics regarding each player's participation in a particular game during at least one period of time, and ii) wherein the aggregate statistics is user-defined and comprises a distribution of cash in—cash out amounts per each play type played by the player, wherein the distribution is based on: 1) an amount of each transaction; 2) a largest amount from all cash in—cash out amounts; 3) a total number of transactions whose value was within a predetermined range; and 4) at least one transaction whose value was required official approval; c) code to store by the computer system the at least one two-dimensional array in at least one data structure; d) code to scan, using the received information for the at least one first transaction, by the computer system the at least one data structure to identify at least one abnormal pattern; e) code to generate, when the at least one abnormal pattern is identified, by the computer system an alert prior to a payout on the at least one first transaction; f) code to scan, using the received information for the at least one second transaction, by the computer system the at least one data structure to identify at least one abnormal pattern; and e) code to generate, when the at least one abnormal pattern is identified, by the computer system an alert prior to a payout on the at least one second transaction.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications and/or alternative embodiments may become apparent to those of ordinary skill in the art. For example, any steps may be performed in any desired order (and any desired steps may be added and/or any desired steps may be deleted). Therefore, it will be understood that the appended claims are intended to cover all such modifications and embodiments that come within the spirit and scope of the present invention.

We claim:

1. A method performed in a computing system, the method comprising:
   receiving, by the computer system, from at least one source, in real-time, information regarding a plurality of played coupons for at least one game, wherein the plurality of played coupons comprises at least one first coupon and at least one second coupon;
   populating, by the computer system, in real-time, at least one two-dimensional array for each played game from the received information,
      i) wherein the at least one two-dimensional array holds aggregated statistics, and
      ii) wherein the aggregated statistics is user-defined and is based at least in part on:
         1) at least one source variable associated with the at least one source,
         2) at least one coupon variable associated with the received information regarding for the plurality of played coupons, and
         3) at least one time variable associated with at least one of the following:
            (i) at least one time period during which the received information has been received and
            (ii) at least one time period during which the at least one game has been played
   calculating at least one statistical distribution from the aggregated statistics held by the at least one two-dimensional array;
   storing, by the computer system, the at least one statistical distribution within at least one data structure, wherein the at least one data structure is organized as at least one cell of a data cube, having (i) at least one first data axis associated with the at least one source variable, (ii) at least one second data axis associated with the at least one coupon variable, and (iii) at least one third data axis associated with the at least one time variable;
   analyzing by the computer system, in real-time, the at least one data structure to identify at least one first abnormal pattern based at least in part on the received game information of the at least one first coupon;
   generating, by the computer system, in real-time, at least one first alert prior to a payout on the at least one first coupon when the at least one first abnormal pattern is identified;
   analyzing, by the computer system, in real-time, the at least one data structure to identify at least one second abnormal pattern based at least in part on the received information of the at least one second coupon; and
   generating, by the computer system in real-time, at least one second alert prior to a payout on the at least one second coupon when the at least one second abnormal pattern is identified.

2. The method of claim 1, wherein the at least one abnormal pattern is when a ratio of a coupon gross amount for a random player to a total gross amount for all players in the at least one game exceeds a predetermined ratio amount.

3. The method of claim 1, wherein the at least one source is a computer system of at least one agent and wherein the at least one abnormal pattern is a presence of similar betting combinations from the at least one agent.

4. The method of claim 3, wherein the at least one abnormal pattern is a presence of similar betting combinations from at least two agents.

5. The method of claim 3, wherein the at least one abnormal pattern is when the plurality of the played coupons include bets having, an identical amount placed for all played combinations.

6. The method of claim 1, wherein the at least one abnormal pattern is when a frequency of cancellations for the at least one source exceeds a predetermined cancellation frequency threshold number.

7. The method of claim 1, wherein the at least one abnormal pattern is when a percentage of participation in the at least one game during a sampled time period to a total participation in the at least one game exceeds a predetermined participation percentage.

8. The method of claim 1, wherein the at least one abnormal pattern is when the at least one played coupon includes bets for all played combinations in the at least one played coupon.

9. The method of claim 1, wherein the at least one abnormal pattern is when the plurality of the played coupons received from the at least one source include bets, having an identical amounts placed for all played combinations.

10. The method of claim 1, wherein the at least one abnormal pattern is when the plurality of played coupons received from a plurality of sources include bets, having an identical amount placed for all played combinations.

11. The method of claim 1, wherein the at least one abnormal pattern is when the a plurality of the played coupons include bets, having amounts that are less than a limit amount by less than a predetermined deviation amount.

12. The method of claim 1, wherein the at least one abnormal pattern is when the at least one played coupon is a winning coupon and wherein the at least one played coupon is received for payment during a predetermined period prior to an expiration date of the at least one played coupon.

13. The method of claim 1, wherein the at least one coupon variable comprises one of the following data:
   1) an amount of each transaction;
   2) a largest amount from all cash in-cash out amounts;
   3) a total number of transactions whose value was within a predetermined range; and
   4) at least one transaction whose value was required official approval; and wherein the at least one statistical distribution represents cash in-cash out amounts per each play type played by a player.

14. The method of claim 13, wherein the at least one abnormal pattern is based on a number of times and on a frequency with which a cash in-cash out amount correlated with a particular play type and winnings.

15. The method of claim 13, wherein the at least one abnormal pattern relates to the player's usage of at least one bank account and at least one credit card account and is based on at least one of:
   i) the amount of each transactions;
   ii) a type of the usage;
   iii) a frequency of the usage; and
   iv) a frequency of change the at least one bank account or at least one credit card account.

16. The method of claim 13, wherein the at least one abnormal pattern relates to a frequency of changing player's profile and is based on a similarity between an old and a new profiles.

17. The method of claim 16, wherein the at least one abnormal pattern is when a number of changes to the player's profile exceeds a predetermined change number for at least one the following categories of the personal information:
   a) password change frequency,
   b) credit card numbers or pointers to credit card numbers,
   c) account block or exclude, and
   d) play cancellation and amount of cancellation.

18. A computer system, comprising:
   a) a non-transient memory having at least one region for storing computer executable program code; and
   b) at least one processor for executing the program code stored in the non-transient memory, wherein the program code comprising:
   code to receive, in real-time, from at least one source information regarding a plurality of played coupons for at least one game, wherein the plurality of played coupons comprises at least one first coupon and at least one second coupon;
   code to populate, in real-time, at least one two-dimensional array for each played game from the received information,
      i) wherein the at least one two-dimensional array holds aggregated statistics, and
      ii) wherein the aggregated statistics is user-defined and is based at least in part on:
         1) at least one source variable associated with the at least one source,
         2) at least one coupon variable associated with the received information regarding for the plurality of played coupons, and
         3) at least one time variable associated with at least one of the following:
            (i) at least one time period during which the received information has been received and
            (ii) at least one time period during which the at least one game has been played;
   code to calculate at least one statistical distribution from the aggregated statistics held by the at least one two-dimensional array;
   code to store the at least one statistical distribution within at least one data structure, wherein the at least one data structure is organized as at least one cell of a data cube, having (i) at least one first data axis associated with the at least one source variable, (ii) at least one second data axis associated with the at least one coupon variable, and (iii) at least one third data axis associated with the at least one time variable;
   code to analyze, in real-time, the at least one data structure to identify at least one first abnormal pattern based at least in part on the received game information of the at least one first coupon;
   code to generate, in real-time, at least one first alert prior to a payout on the at least one first coupon when the at least one first abnormal pattern is identified;
   code to analyze, in real-time, the at least one data structure to identify at least one second abnormal pattern based at least in part on the received information of the at least one second coupon; and
   code to generate, in real-time, at least one second alert prior to a payout on the at least one second coupon when the at least one second abnormal pattern is identified.

19. The system of claim 18, wherein the at least one abnormal pattern is when a ratio of a coupon gross amount for a random player to a total gross amount for all players in the at least one game exceeds a predetermined ratio amount.

20. The system of claim 18, wherein the at least one source is a computer system of at least one agent and wherein the at least one abnormal pattern is a presence of similar betting combinations from the at least one agent.

21. The system of claim 20, wherein the at least one abnormal pattern is a presence of similar betting combinations from at least two agents.

22. The system of claim 18, wherein the at least one abnormal pattern is when a frequency of cancellations for the at least one source exceeds a predetermined cancellation frequency threshold number.

23. The system of claim 18, wherein the at least one abnormal pattern is when a percentage of participation in the at least one game during a sampled time period to a total participation in the at least one game exceeds a predetermined participation percentage.

24. The system of claim 18, wherein the at least one abnormal pattern is when the at least one played coupon includes bets for all played combinations in the at least one played coupon.

25. The system of claim 18, wherein the at least one abnormal pattern is when the plurality of the played coupons received from the at least one source include bets, having an identical amounts placed for all played combinations.

26. The system of claim 18, wherein the at least one coupon variable comprises one of the following data:
   1) an amount of each transaction;
   2) a largest amount from all cash in-cash out amounts;
   3) a total number of transactions whose value was within a predetermined range; and
   4) at least one transaction whose value was required official approval; and wherein the at least one statistical distribution represents cash in-cash out amounts per each play type played by a player.

27. The computer system of claim 18, wherein the at least one abnormal pattern is based at least in part on one of the following:
- i) on a number of times and on a frequency with which a cash in-cash out amount correlated with a particular play type and winnings;
- ii) the player's usage of at least one bank account;
- iii) the player's usage of at least one credit card account; and iv) the player's profile.

\* \* \* \* \*